(12) United States Patent
Keller et al.

(10) Patent No.: US 12,586,388 B2
(45) Date of Patent: Mar. 24, 2026

(54) METHOD FOR DETERMINING A FREE SPACE IN VEHICLE SURROUNDINGS

(71) Applicant: HELLA GmbH & Co. KGaA, Lippstadt (DE)

(72) Inventors: Friedrich Keller, Lippstadt (DE); Michael Skutek, Erwitte (DE); Wladimir Fischer, Liesborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 321 days.

(21) Appl. No.: 18/211,730

(22) Filed: Jun. 20, 2023

(65) Prior Publication Data

US 2023/0334875 A1      Oct. 19, 2023

Related U.S. Application Data

(63) Continuation of application No. PCT/EP2021/084751, filed on Dec. 8, 2021.

(30) Foreign Application Priority Data

Dec. 21, 2020    (DE) ..................... 10 2020 134 331.0

(51) Int. Cl.
*G06V 20/58* (2022.01)
*G06V 10/44* (2022.01)

(52) U.S. Cl.
CPC ............ *G06V 20/586* (2022.01); *G06V 10/44* (2022.01)

(58) Field of Classification Search
CPC .............................. G06V 20/586; G06V 10/44
See application file for complete search history.

(56) References Cited

U.S. PATENT DOCUMENTS

| | | | |
|---|---|---|---|
| 2020/0001863 A1* | 1/2020 | Li ........................ | B60W 60/001 |
| 2020/0193189 A1* | 6/2020 | Okada .................. | G06V 10/443 |
| 2020/0380275 A1 | 12/2020 | Furukawa et al. | |

FOREIGN PATENT DOCUMENTS

| | | |
|---|---|---|
| DE | 102015115012 A1 | 3/2017 |
| DE | 102017115475 A1 | 1/2019 |

OTHER PUBLICATIONS

"Wei Li et al., Vacant Parking Slot Detection in the Around View Image Based on Deep Learning, Apr. 2020, Sensors 2020, 20[7]" (Year: 2020).*

(Continued)

*Primary Examiner* — Chineyere Wills-Burns
*Assistant Examiner* — Phuong Hau Cai
(74) *Attorney, Agent, or Firm* — Muncy, Geissler, Olds & Lowe, P.C.

(57)                ABSTRACT
A method for determining at least one free space in vehicle surroundings of a vehicle. The method includes receiving at least two-dimensional contour points of objects in the vehicle surroundings, assigning the received contour points to a plurality of rows, which subdivide into rows pf at least one field of vision situated in the vehicle surroundings, ascertaining the particular contour point within a row for at least a portion of the plurality of rows as the minimum contour point, which, of all contour points assigned to this row, has the shortest contour point distance to a reference system of the vehicle within the particular row, and connecting the previously determined minimum contour points to a free space or multiple free spaces within the at least one field of vision.

16 Claims, 9 Drawing Sheets

(56) References Cited

OTHER PUBLICATIONS

"Qian Li et al., Geometric Features-Based Parking Slot Detection, Aug. 2018, Sensors [Basel], 18[9]:2821" (Year: 2018).*

"Bijo Thomas et al., Development of Cost Effective Bird's Eye View Parking Assistance System, Sep. 2011, 2011 IEEE Recent Advances in Intelligent Computational Systems" (Year: 2011).*

Eraqi, H. M. et al "Static Free Space Detection with Laser Scanner using Occupancy Grid Maps" IEEE 20th International Conference on Intelligent Transportation Systems (ITSC), Yokohama, Japan, Oct. 2017.

Schreier, M. et al "From Grid Maps to Parametric Free Space Maps - A Highly Compact, Generic Environment Representation for ADAS" IEEE $22^{nd}$ Intelligent Vehicles Symposium (IV) Jun. 23-26, 2013, Gold Coast, Austrailia.

Schmid, M. et al: "Parking Space Detection with Hierarchical Dynamic Occupancy Grids" 2011 IEEE Intelligent Vehicles Symposium (IV) Baden-Baden, Germany, Jun. 5-9, 2011.

International Search Report dated Mar. 28, 2022 in corresponding application PCT/EP2021/084751.

* cited by examiner

| |
|---|
| 8.N |
| 8.10 |
| 8.9 |
| 8.8 |
| 8.7 |
| 8.6 |
| 8.5 |
| 8.4 |
| 8.3 |
| 8.2 |
| 8.1 |

METHOD FOR DETERMINING A FREE SPACE IN VEHICLE SURROUNDINGS

This nonprovisional application is a continuation of International Application No PCT/EP2021/084751, which was filed on Dec. 8, 2021, and which claims priority to German Patent Application No 10 2020 134 331.0, which was filed in Germany on Dec. 21, 2020, and which are both herein incorporated by reference.

BACKGROUND OF THE INVENTION

Field of the Invention

The invention relates to a method for determining at least one free space in vehicle surroundings of a vehicle, a computer program product, a control unit for a vehicle, a driver assistance system including the control unit and a vehicle sensor, as well as a vehicle.

Description of the Background Art

The capture of the (static) vehicle surroundings is necessary for various driver assistance systems in vehicles, such as electronic proximity warning and automated parking, and for multiple stages of autonomous driving, for example traffic lane detection. Ultrasonic sensors are typically used for driver assistance systems, such as automated parking or electronic proximity warning. Other sensors for more general detection of the static surroundings are, for example, camera sensors, laser scanners, or radar sensors.

The static vehicle surroundings may be indicated by pieces of contour information. These pieces of contour information depend on the type of measurement principle and the signal processing for detection and filtering. In the case of radar sensors and laser scanners, the static surroundings may be indicated with the aid of a list of points. The number of points depends on the measurement principle, the signal processing, and the observation time. Vehicle components which contain contour information of this type may be connected, for example, via CAN or Ethernet. Interfaces of this type have a limited bandwidth and may require a considerable reduction of the data presently transmitted. A further reason for the necessity of a data reduction is the computational effort for the recipient, which may also be limited.

In addition to this limited bandwidth, the data volume is not needed for later processing steps in a control unit of the vehicle. Most driver assistance functions do not require all detected contours or collected pieces of contour information. The single most common and frequent piece of information required is the free space, or the free space around the own vehicle, also referred to as the ego vehicle, for example to evaluate the probability of collisions or to calculate the trajectory.

The limited bandwidth results in a further desired requirement. This is the possibility of ensuring a static resolution at each location within a defined field of vision.

Different approaches exist from the prior art for detecting the static vehicle surroundings and extracting the pieces of free space information. The free space information may be defined as the space between the ego vehicle and the nearest static object(s) for all directions within the field of vision. In other words, it is the (drivable) space between the ego vehicle and all surrounding static objects in all relevant directions.

A typical approach for detecting static contours is the verification grid as known from M. Schreier et al., "From Grid Maps to Parametric Free Space Maps-A Highly Compact, Generic Environment Representation for ADAS" (IEEE Intelligent Vehicle Symposium [IV 2013]). Each grid cell is marked as being occupied or unoccupied, depending on measurements which may be assigned to this cell during the last measurement cycles. There are different possibilities for deciding that a grid cell is occupied, for example on the basis of statistical functions. The extraction of the free space is easy in this case: The free space is made up of all unoccupied cells around the ego vehicle and between the ego vehicle and the nearest occupied grid cells. Also see Hesham M. Eraqi, Jens Honer, and Sebastian Zuther, "Static free space detection with laser scanner using occupancy grid maps" (arXiv preprint arXiv: 1801.00600 [2018]), and Schmid, M. R., Ates, S., Dickmann, J., von Hundelshausen, F., & Wuensche, H.-J. (2011 June), "Parking space detection with hierarchical dynamic occupancy grids" (2011 IEEE Intelligent Vehicles Symposium [IV], pp. 254-259).

This method is very commonly used and offers a simple possibility for processing signals. However, the resolution of the extracted data depends directly on the dimensions of the grid cells, and the computational effort (or the runtime) is very high for generating the grid cell information used as the basis for the free space evaluation.

A further method for estimating free space (under the assumption that contours are already present) is to calculate the intersection points of a line, starting at the ego position [0, 0] with the nearest contour element. This line is rotated with a static or dynamic angle section (static origin at the ego position), and the intersection point with the nearest contour element is evaluated for each step.

A very similar variant could be to use rotating angle segments and check them with the region in which the first detection is located.

This method is also commonly used, but the resolution of the free space boundary decreases as the range of the intersection point increases. This method also depends on the direct line of sight. It is unable to detect free space that is covered by a contour, and it cannot see around corners. This limits the applicability for automated driving, since it requires a very low speed in order to detect an intersection.

SUMMARY OF THE INVENTION

It is therefore an object of the invention to mitigate the disadvantages known from the prior art. In particular, an object of the invention is to propose a method for determining at least one free space in vehicle surroundings of a vehicle, which is particularly easy and reliable and greatly reduces the necessary data volume compared to the known methods.

The above object is achieved, in particular, by a method for determining at least one free space in vehicle surroundings of a vehicle, a computer program product, a control unit, a driver assistance system, as well as a vehicle. Features and details which are disclosed in connection with the method according to the invention are, of course also disclosed in connection with the computer program product according to the invention, the control unit according to the invention, the driver assistance system according to the invention, and the vehicle according to the invention, as well as vice versa in each case, so that reference always is or may be made interchangeably with regard to the disclosure of the individual aspects of the invention.

According to an aspect, the invention achieves the object via a method for determining at least one free space in vehicle surroundings of a vehicle, the method including the following steps: (a) Receiving at least two-dimensional contour points of objects in the vehicle surroundings; (b) Assigning the received contour points to a plurality of rows, which subdivide into rows at least one field of vision situated in the vehicle surroundings and considered within the scope of the method; (c) Ascertaining the particular contour point within a row for at least one portion of the plurality of rows as the minimum contour point which, of all contour points assigned to this row, has the shortest contour point distance to a reference system of the vehicle within the particular row; and (d) Connecting the previously ascertained minimum contour points to a free space or multiple free spaces within the at least one field of vision considered.

Accordingly, the invention provides a method (as well as a computer program product according to the second aspect of the invention) for reducing the data in the entire signal processing chain within a control unit or a driver assistance system of a vehicle. This consistently reduces the computational effort and the storage space requirements. In addition, the at least one free space or multiple free spaces may likewise be particularly easily determined from this reduced data volume. A further important advantage achieved according to the invention is a fixed (position) resolution of the free space description.

The method may, in principle, be carried out in one two-dimensional plane, two-dimensional contour points of the objects in the vehicle surroundings being received according to method step (a) and being processed according to method steps (b) through (d). It is, of course, also possible, however, to carry out the method in multiple two-dimensional planes or in three-dimensional space. Three-dimensional contour points of the objects in the vehicle surroundings may be received in method step (a). The three-dimensional contour points of the objects in the vehicle surroundings may then be processed according to method steps (b) through (d), this being able to take place in each case for each of multiple two-dimensional planes or for the entire three-dimensional space as a whole. As will be clarified later on, based on different driver assistance systems or application area of the method, it may be sensible to consider different two-dimensional plans or planes of different heights for different driver assistance systems or application areas and therefore (to capture and) to receive the at least two-dimensional contour points for different planes or heights.

Correspondingly, the free space may be determined as a two-dimensional or a three-dimensional free space. It may be delimited from the vehicle or ego vehicle or determined by the connected minimum contour points. The ego vehicle is understood to be the vehicle, in which or from which the method is carried out or the driver assistance system is used. The free space may thus be defined as the space between the ego vehicle and the nearest static object(s) within the vehicle surroundings (for all directions) within the field of vision considered. In other words, the free space may be expressed as the (drivable) space between the ego vehicle and all surrounding static objects in the field of vision considered.

The field of vision considered may be defined ahead of time with regard to its position in the vehicle surroundings, its orientation, and/or its size, or it may be selected individually depending on the driver assistance system or the particular application area of the method. The field of vision may thus be different for different application areas of the method, so that different fields of vision may be considered within the scope of the method carried out for different application areas. The field of vision may be defined as a two-dimensional or three-dimensional field of vision. The subdivision of the field of vision into the plurality of rows may be defined ahead of time or also be defined depending on the application area. Different resolutions of the field of vision may thus be defined, in which more or fewer rows are selected for the subdivision of the field of vision. In the case of a smaller number of rows or a correspondingly greater row height of the individual row with a given number of rows, the resolution decreases, by which means the data volume may be further reduced. The resolution may be selected in such a way that it is (just) sufficient for the application area or the particular driver assistance system. In principle, the number of fields of vision considered is unlimited. The field of vision may be arranged in a rectangular manner as well as rotated with respect to the vehicle.

It may be provided that the at least one field of vision is provided with a rectangular or (semi) circular design. The shape or geometry of the field of vision may thus also be predefined or selected specifically for the particular application area of the method or the particular driver assistance system of the (ego) vehicle. In the case of a circular geometry of the field of vision, the fields of vision are circular. In the case of a semicircular partial geometry of the field of vision, multiple fields of vision considered may together surround a circular shape or cover circular vehicle surroundings. The vehicle surroundings may be, in principle, ring-shaped, and be monitored in this way. The ego vehicle is situated within the ring, and the monitored ring of the vehicle surroundings is formed by the fields of vision.

The contour points within rows of at least a portion of the rows or all rows of the plurality of rows of the field of vision, which have the shortest contour point distances of the contour point to the reference system of the vehicle within the rows to which they have been assigned, are determined as minimum contour points. In other words, the minimum contour point which has the shortest distance or contour point distance to the reference system is ascertained in each case for all contour points within one row. This is carried out or repeated for at least a portion of the rows of the plurality of rows or for all rows of the plurality of rows. The minimum contour points within the portion of the rows of the plurality of rows are obtained thereby. The remaining contour points which have been received may be ignored for the following method, in particular deleted (from a memory in which they have been stored) in order to reduce the data volume. It may be the case that the minimum contour points are determined only for a portion of the rows of the plurality of rows, based on the shortest contour point distance, for example if no contour points have been assigned to the individual rows. This may occur, in particular, if the resolution of the field of vision considered was selected to be very high or if a large number of rows subdivides the field of vision.

The connection of the previously ascertained minimum contour points to a free space or multiple free spaces within the at least one field of vision considered may take place by connecting the next minimum contour points of the particular rows, i.e. by means of angled connecting lines between the minimum contour points, or by a simple linking of the row distances (which then results in a stepped pattern (cf. FIG. 6)), if a great deal of storage space and computing time is to be saved.

The method may be, in particular, a computer-implemented method. As such, it may be carried out by one or multiple computers. Computers are also understood to be control units, in particular of vehicles, or control units may comprise computers. Computers may also be referred to as computing units.

Regardless of the numbering of the method steps for the purpose of delimiting the steps from each other, it is not absolutely necessary to carry out the method steps in the indicated order. It may likewise be provided that the method steps of the method are carried out in the indicated order of (a) through (d).

It may furthermore be provided that the reference system can be formed by at least one reference point or multiple reference points of the reference system. In particular, it may be provided that the reference system is a vehicle longitudinal axis and/or a vehicle transverse axis of the vehicle. The contour points which have the shortest contour point distance to one of the two axes, i.e. the vehicle longitudinal axis or the vehicle transverse axis, may be determined as the minimum contour points. The contour point distance is thus not determined as the distance, for example, from a predefined reference point on the particular axis. Instead, the reference point of the contour point distance is different for each contour point in order to obtain the contour point distances in a standardized manner, based on the distance from the particular axis or in the direction of the particular axis. This permits an easy and precise ascertainment of the minimum contour points.

It may also be provided that the method also comprises the step of a capture of the contour points of the object in the vehicle surroundings with the aid of a vehicle sensor of the vehicle. This may take place with the aid of one or multiple vehicle sensor(s) of a driver assistance system or the vehicle. For example, it is possible to use ultrasonic sensors, camera sensors, laser scanners, and/or radar sensors as vehicle sensors. The contour points may be captures with a high degree of precision thereby in order to subsequently transmit them completely or selectively and finally to receive them according to step (a) of the method.

It may furthermore be provided that at least two fields of visions situated in the vehicle surroundings are considered in the method, and method steps (c) and (d) are carried out for at least two of the at least two fields of vision. Considering two different fields of vision makes it possible to consider larger vehicle surroundings. For example, the consideration of two fields of vision situated in parallel to each other alongside the vehicle may be used to carry out a traffic lane detection, which may be one application area of the method or a corresponding driver assistance system.

It may also be provided that four fields of visions situated in the vehicle surroundings are considered in the method, which together form an area completely surrounding the vehicle, and the method steps (c) and (d) are carried out for at least two or all of the four fields of vision. Of course, the entire vehicle surroundings may be monitored in this way. Depending on the application area of the method or the driver assistance system of the vehicle, only the necessary fields of vision may be evaluated according to method steps (c) and (d) for the purpose of determining the free space needed in each case for the application area or the driver assistance system.

It may also be provided that at least one application field of vision of at least two fields of vision, which is relevant for the application, is determined in each case for different applications in the driver assistance system, the at least one application field of vision being considered in the method, and method steps (c) and (d) being carried out for the at least one application field of vision of the at least two fields of vision. In other word, the selection of the consideration of one or two or more fields of vision may be made dependent on the application area of the method or the driver assistance system, as was addressed above. The data volume may likewise be reduced if, of the multiple possible fields of vision, only the (application) field of vision is considered which is needed for the present application area of the method or the particular driver assistance system of the vehicle. For example, if the application area of the method is an automated lateral parking of the vehicle or the ego vehicle, or if the driver assistance system is an automatic lateral parking system, it is usually sufficient to consider an application field of vision situated behind the vehicle, an application field of vision situated in front of the vehicle, and an application field of vision situated alongside the vehicle. Unnecessary contour points within possible (non-application) fields of vision situated in front of the vehicle and a further (non-application) field of vision situated alongside the vehicle do not have to be captured, or at least not received or processed, or at least not necessarily or completely, for this application area or driver assistance system to be able to carry out a safe automated lateral parking in a determined free space without the vehicle coming into physical contact with objects. The data volume is thus reduced because free spaces are not determined in fields of vision or parts of the vehicle surroundings not considered for the application area or driver assistance system.

In particular, it may be provided that a free parking space is ascertained based on the at least one free space. For this purpose, a comparison may be carried out between the at least one determined free space and the size (and geometry) of a free parking space needed for a parking. If the at least one determined free space contains the free parking space or its size (and geometry) or facilitates a parking, the free parking space may be ascertained. Correspondingly, the ascertained free parking space may be used in an application area of the method or the driver assistance system for automated parking to safely park the (ego) vehicle therein.

The ascertainment of the free parking space is likewise only one possible application area of the method according to the invention. The determined free space may also be used for other application areas or driver assistance systems, such as (individual stages of) autonomous driving, curb detection, as well as for the further applications mentioned within the scope of the description.

It may also be provided that, for rows without an assigned contour point, the contour points of the nearest neighboring cells are determined which are connected to each other with the aid of a connecting line, so that a point on the connecting line within the row without an assigned contour point having the shortest contour point distance is ascertained as the minimum contour point. This point on the connecting line is typically situated on one of two row lines of the particular row, which shares the row with the neighboring rows. The point may thus also be viewed as the intersection point of the line with one of the row lines. An approximate determination of a minimum contour point in a row without an assigned contour point is made possible thereby. This may be necessary in the case of a very low resolution, as already explained above.

It may furthermore be provided that, in cases in which a connecting line of a contour point assigned to a cell to a contour point of a neighboring cell has a point within the cell, which has a shorter contour point distance than a contour point assigned to this cell, the point on the connecting line having the shorter contour point distance is ascertained as the minimum contour point. This enables the ascertained free space to be reduced in size in favor of a precise detection, due to an erroneous determination of the minimum contour point, in particular at a low resolution and/or in the case of few contour points within the row. In other words, the connecting line is used as a comparison variable to determine whether a contour point within the row does in fact represent a minimum contour point or whether an intersection point of the connecting line with one of the two row lines of this row does not actually indicate a more probable minimum contour point or a more reliable one at least with regard to an accurate detection.

Moreover, it may be provided that a row height of the plurality of rows of a field of vision considered and/or a position of the at least one considered field of vision within the vehicle surroundings is/are determined depending on at least one driving parameter, in particular a velocity. Of course, the number of the plurality of rows may also be changed. This makes it possible to improve the method by adapting the field of vision to at least one driving parameter, such as the velocity. The data volume may be reduced or enlarged thereby, depending on requirements induced by the at least one driving parameter. It is, of course, also possible to define the size of the field of vision as a whole, for example by selecting the row width and/or the number of rows, depending on the at least one driving parameter.

It may also be provided that different rows of the plurality of rows of a considered field of vision having different row heights are defined. This permits a locally improved resolution in critical regions of the considered field of vision. The resolution may, in turn, be reduced in non-critical regions of the considered field of vision to reduce the data volume.

According to a second aspect of the invention, the object mentioned at the outset is achieved by a computer program product comprising commands, which, when the computer program product is executed by a computer, prompt the latter to carry out the method according to the first aspect of the invention.

A computer can be understood to be, in particular, also a control unit of a vehicle or, that at least control units of this type comprise a computer, which may also be referred to as a computing unit.

According to a third aspect of the invention, the object mentioned at the outset is achieved by a control unit for a vehicle, the control unit being configured to carry out the method according to the first aspect of the invention.

The control unit may include a computer or a computing unit. The control unit may furthermore include a storage medium. The computer program product according to the second aspect of the invention may be stored on the storage medium. The commands comprised in the computer program product may finally be executed by the computer of the control unit for the purpose of carrying out the method according to the first aspect of the invention.

According to a fourth aspect of the invention, the object mentioned at the outset is achieved by a driver assistance system, including a control unit according to the third aspect of the invention and a vehicle sensor for capturing the contour points of the objects in the vehicle surroundings.

The vehicle sensor may be correspondingly configured to transmit the captured contour points to the control unit, which then, in turn, receives the contour points. In particular, the driver assistance system may include multiple vehicle sensors for capturing the contour points of the objects in the vehicle surroundings. These vehicle sensors may be of the same type or of different types. For example, it is possible for the vehicle sensors to be ultrasonic sensors, camera sensors, laser scanners, and/or radar sensors.

According to a fifth aspect of the invention, the object mentioned at the outset is achieved by a vehicle, including a driver assistance system according to the fourth aspect of the invention.

The driver assistance system may, of course, offer different application areas or assistance functions, such as automated parking or electronic distance detection, or the vehicle may comprise multiple driver assistance systems for different application areas. In the case of different driver assistance systems, the latter may include a common control unit or different control units, which are configured according to the third aspect of the invention. It may also be provided that driver assistance systems may access or contain the same vehicle sensors.

Other measures which improve the invention are derived from the following description of different exemplary embodiments of the invention, which are illustrated schematically in the figures. All features and/or advantages arising from the claims, the description or the figures, including structural details and spatial arrangements, may be essential to the invention individually as well as in the different combinations.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a schematic representation of the field of vision subdivided into rows from FIGS. 1 through 4;

DETAILED DESCRIPTION

Figure 1:
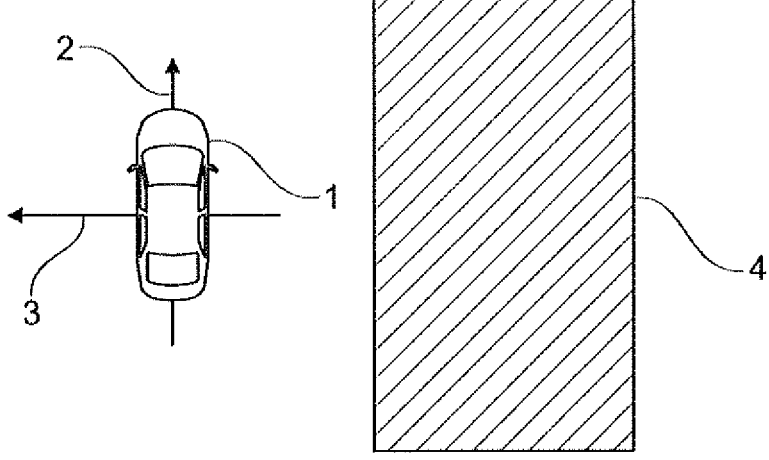
FIG. 1 shows a schematic top view of a first graphical representation in connection with a method according to the invention according to an example.

FIG. 1 shows a first graphical representation in connection with a method 30 according to the invention (cf. FIG. 8) according to one exemplary embodiment of the invention.

A vehicle 1 or ego vehicle includes a reference system 2, 3. In the present case, the reference system is formed by a vehicle longitudinal axis 2 and by a vehicle transverse axis 3.

A field of vision 4 in the vehicle surroundings of vehicle 1 is considered within the scope of method 30. In the following, only vehicle longitudinal axis 2 is used as the reference system for this field of vision 4. A free space 6 (cf. FIGS. 2, 4, 6) is to be detected or determined in considered field of vision 4 with the aid of method 30. Determined free space 6 may be used for different application areas of vehicle 1 or for different driver assistance systems 20 (cf. FIG. 7) or a driver assistance system 20 having different application areas of vehicle 1.

Figure 2:
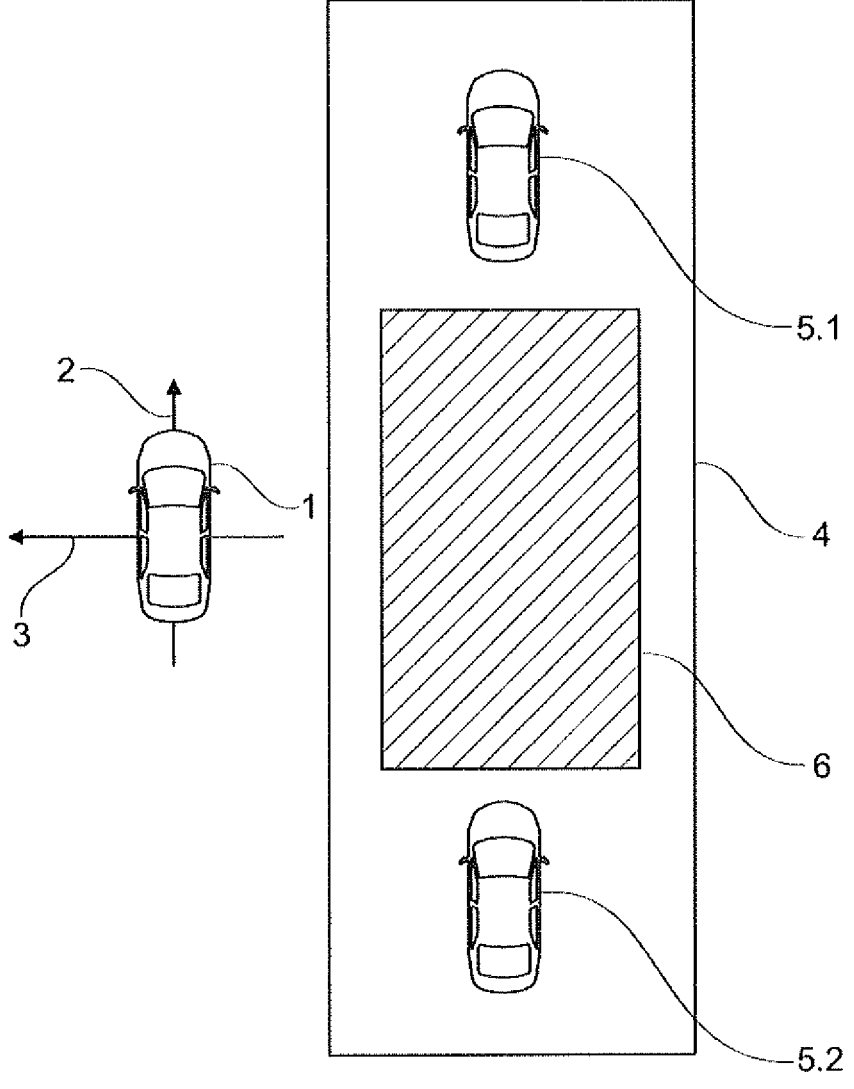
FIG. 2 shows a schematic top view of a second graphical representation in connection with an example of an application area of the method according to the invention.

For example, a second graphical representation is shown in FIG. 2 in connection with method 30 according to the invention, in which a free space 6 for a parking of vehicle 1 is situated within considered field of vision 4, in which vehicle 1 may be parked. In other words, this is the application area of a lateral parking of vehicle 1. For example, the application area may relate to a driver assistance system 20 for automated parking or an electronic proximity warning device. Free space 6 to be determined is situated between two objects 5.1, 5.2, which, in turn, are other vehicles in the present case.

Figure 3:
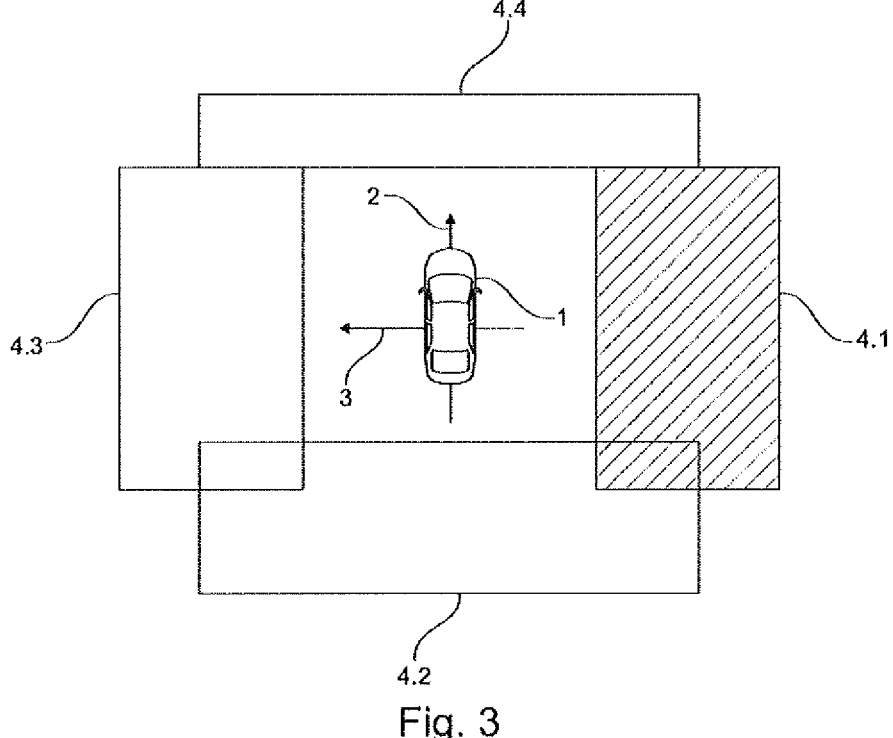
FIG. 3 shows a schematic top view of a third graphical representation in connection with the method according to the invention.

In addition to considering only one field of vision 4 according to FIGS. 1, 2, in a third graphical representation, it is shown that more than only one field of vision 4 may also be considered within the scope of method 30 according to the invention, in which a free space 6 or multiple free spaces 6 is/are to be detected. In this case, four fields of vision 4.1, 4.2, 4.3, 4.4 are shown as examples in FIG. 3.

Figure 4:
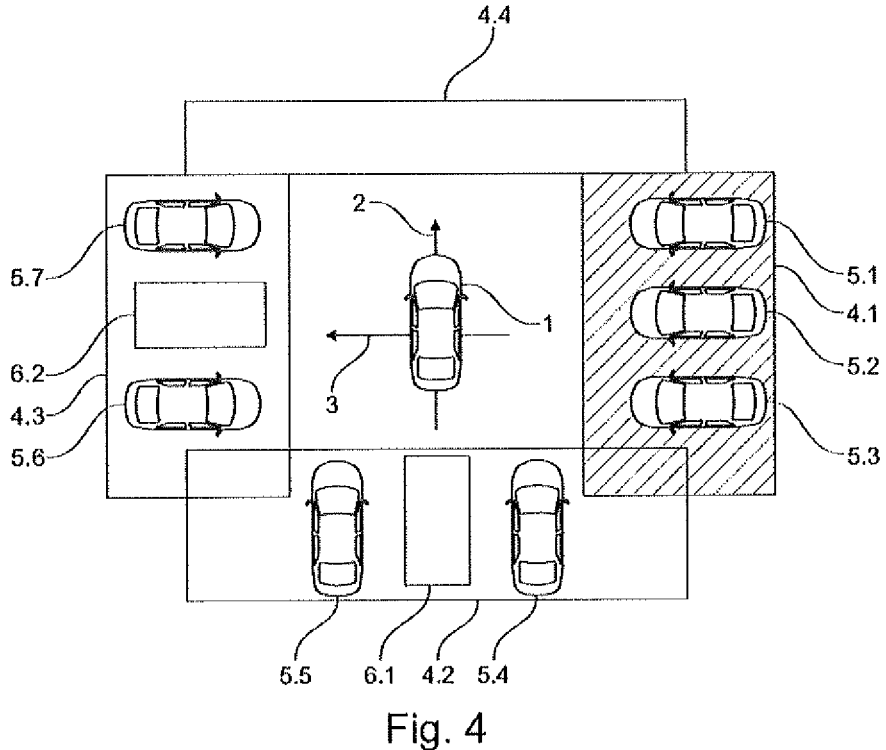
FIG. 4 shows a schematic top view of a fourth graphical representation in connection with a further example of an application area of the method according to the invention.

In the graphical representation in FIG. 4, the exemplary application area is again illustrated for this purpose with driver assistance system 20 in the form of an automated parking system or an electronic proximity warning device, in this case, however, by detecting four fields of vision 4.1, 4.2, 4.3, 4.4, which completely cover the vehicle surroundings of vehicle 1 or surround vehicle 1 completely or by 360°. Objects 5.1, 5.2, 5.3, 5.4, 5.5, 5.6, 5.7, are again situated within fields of vision 4.1, 4.2, 4.3, 4.4, between which free spaces 6.1, 6.2 exist, which are large enough to function as parking spaces and which may be determined within the scope of method 30. Fields of vision 4.1, 4.2, 4.3, 4.4 in this case are selected to be, for example, rectangular, and overlap each other. Alternatively, however, fields of vision 4.1, 4.2, 4.3, 4.4 may also not overlap or have a different shape or geometry, for example, they may be circular.

Figure 5:
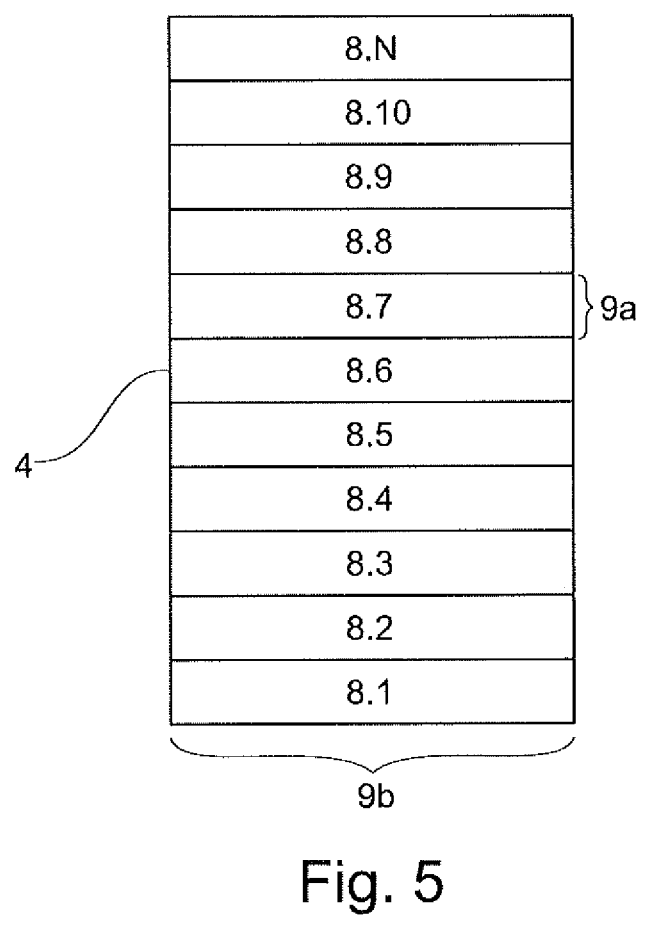

FIG. 5 shows how fields of vision 4 subdivide into a plurality of rows 8.1 through 8.N within the scope of method 30 in order to be evaluated with the aid of method 30, as explained in greater detail below. Each of rows 8.1 through 8.N has a row height 9a and a row width 9b. The plurality of rows 8.1 through 8.N thus define the size of field of vision 4.

Figure 6:
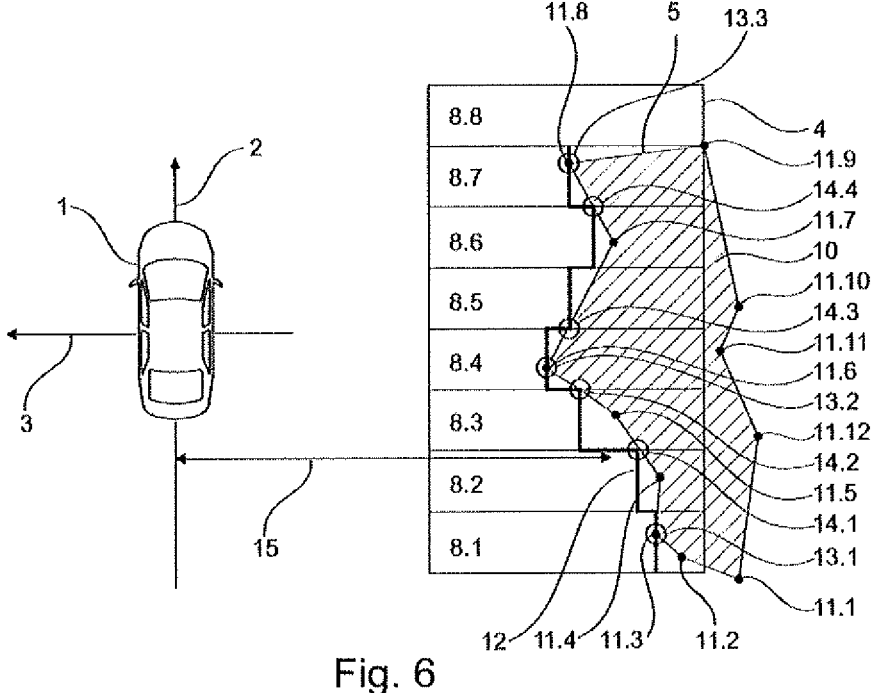
FIG. 6 shows a schematic graphical representation of method steps in the method according to the invention.
Figure 8:
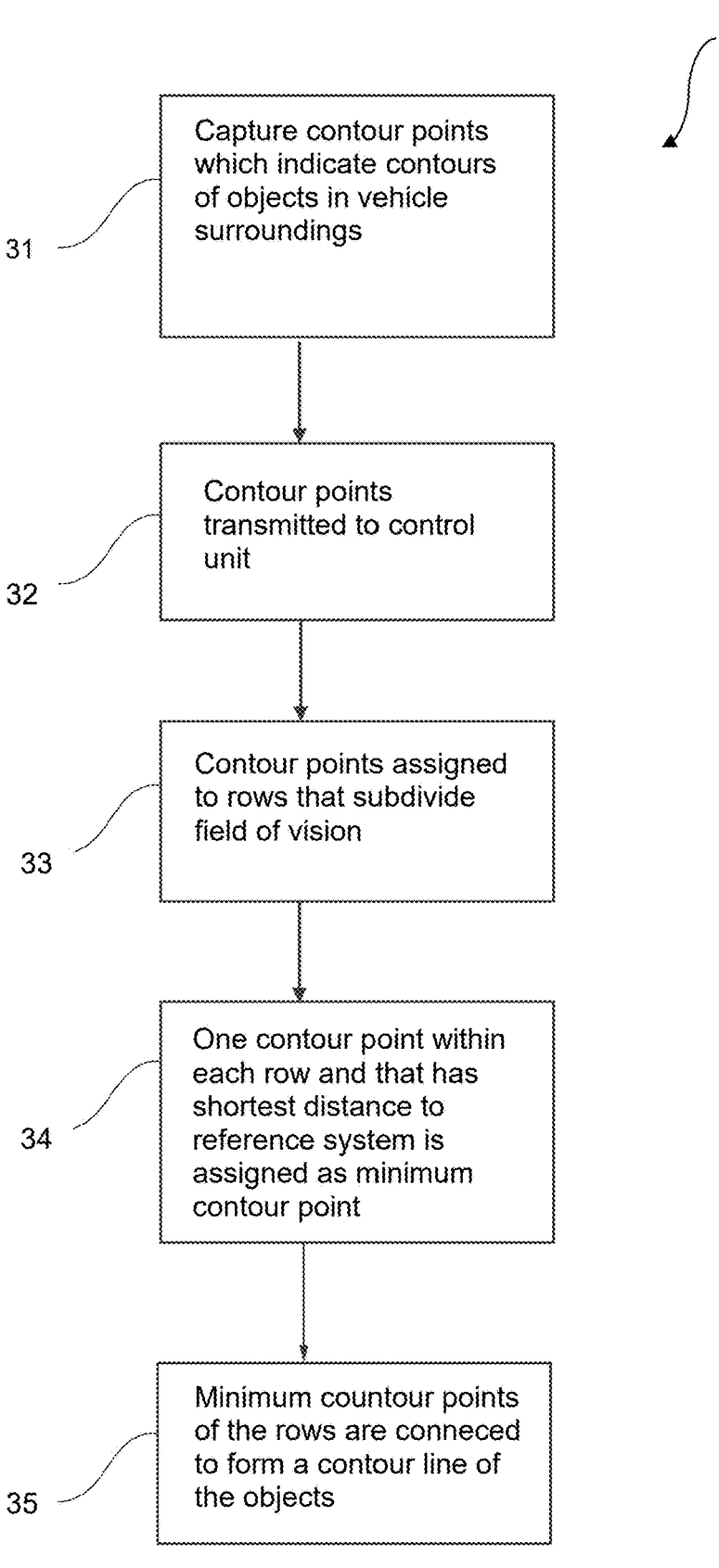
FIG. 8 shows a schematic representation of method steps in the method according to the invention.

FIG. 6 now shows a graphical representation of a portion of method 30 according to the invention, as illustrated schematically in FIG. 8 and explained in greater detail with regard to FIGS. 6 and 8.

Figure 7:
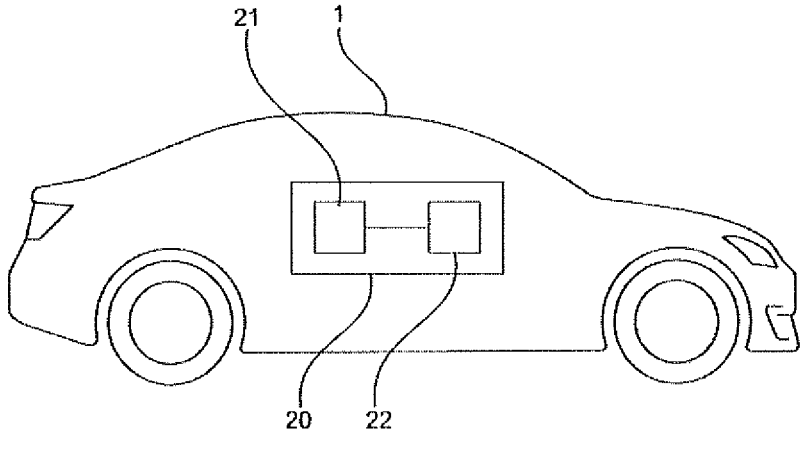
FIG. 7 shows a side view of a vehicle according to the invention according to an example.

FIG. 7 schematically shows vehicle 1, including its components used for this purpose, namely a driver assistance system 20, including a control unit 21, which carries out method 30, and at least one vehicle sensor 22. The representation in FIG. 7 is only schematic, so that vehicle sensor 22 may, of course, be situated at an arbitrary position and also be formed by multiple vehicle sensors 22.

In a first method step 31 (cf. FIG. 8), vehicle sensor 22 initially captures contour points 11.1 through 11.12, which indicate the contours of (foreign) objects 5 in the vehicle surroundings, as illustrated in FIGS. 2 and 4. The latter are represented graphically in FIG. 6. For the sake of simplicity, only one field of vision 4 situated in parallel to vehicle longitudinal axis 2 is considered as field of vision 4 in the present example. This field of vision 4 was predefined with respect to its position and size, which has been defined specifically for the application area, for example lateral parking in this case. In addition to the examples of application areas explained above, this may be, for example, a curb detection. Field of vision 4 may be correspondingly situated at a height in the region of the curb edge. Contour points 11.1 through 11.12 may be at least two-dimensional, i.e., defined by two coordinates in space, the image plane in the present case. It is likewise possible to capture three-dimensional contour points 11.1 through 11.12 over different heights or an entire range of heights. This may be selected specifically for the application area.

In a second method step 32, contour points 11.1 through 11.12 of objects 5 in the vehicle surroundings captured with the aid of vehicle sensor 22 are transmitted to control unit 21 and received at control unit 21. They may be stored on a memory unit 41 of control unit 21 (cf. FIG. 9).

In a third method step 33, received contour points 11.1 through 11.12 are assigned to the present finite plurality of rows 8.1 through 8.8, which subdivide into rows field of vision 4 situated in the vehicle surroundings and considered within the scope of the method. In the present case, it is apparent that, for example, contour points 11.2, 11.3 are assigned to row 8.1. Contour point 11.4 is also assigned to row 8.2. Contour point 11.5 is assigned to row 8.3. Contour points 11.6, 11.7, 11.8 are each assigned to rows 8.4, 8.6, 8.7. Contour point 11.9 is assigned to the two rows 8.7, 8.8. None of contour points 11.1 through 11.12 is assigned to row 8.5 because none of contour points 11.1 through 11.12 is situated within this row 8.5. In other words, the assignment is the local assignment of contour points 11.1 through 11.12 to rows 8.1 through 8.8 of a field of vision 4. Contour points 11.1, 11.10, 11.11, 11.12 are situated outside field of vision 4 and are thus not signed to any of rows 8.1 through 8.8. These received contour points 11.1, 11.10, 11.11, 11.12, which are situated outside field of vision 4, may be deleted from memory unit 41 present in control unit 21 to reduce the data volume to be managed and thereby to lower the computational effort of method 30, which is computer-implemented.

In a fourth method step 34, the one of contour points 11.2 through 11.9 remaining or assigned to rows 8.1 through 8.8, which has shortest contour point distance 15 to reference system 2, 3 (the measurement thereof is shown as an example) within particular row 8.1 through 8.8, is ascertained in each case for each of rows 8.1 through 8.8. Reference point 2, 3 in the present case is given by vehicle longitudinal axis 2, since field of vision 4 is situated in parallel hereto. Contour points 11.2 through 11.9 having the shortest contour point distance 15 from vehicle longitudinal axis 2 are referred to below as minimum contour points 13.1 through 13.3 (of the first type).

The procedure in fourth method step 34 is explained as an example based on row 8.1. Two contour points 11.2, 11.3 are assigned to row 8.1. Contour point 11.3 is situated closer to vehicle longitudinal axis 2 than contour point 11.2. In other words, contour point 11.3 has a shorter contour point distance 15 than contour point 11.2. Correspondingly, contour point 11.3 is determined as minimum contour point 13.1.

This is now repeated for remaining rows 8.2 through 8.8. Minimum contour points 13.2, 13.3 are determined.

Unlike the procedure described above, however, single contour point 11.4, which was assigned to this row 8.2, is now not determined as minimum contour point 13 in row 8.2. Fourth method step 34 may namely be supplemented by a check, which searches for a better approach to detecting the contour of object 5 in field of vision 4 in this row 8.2, or at least checks whether contour point 11.4 is, in fact, to be accepted as a minimum contour point 13 or if this represents the best approach. A check is made of whether a connecting line of contour point 11.4 of this row 8.2 to one of contour points 11.2, 11.3, 11.5 (in particular minimum contour point 13, if previously determined) of neighboring rows 8.1, 8.3 has a point within row 8.2, which has a shorter contour point distance 15 than contour point 11.4 assigned to this row 8.2. If this is the case, the point on the connecting line having the shorter contour point distance 15 is ascertained as minimum contour point 14. This minimum contour point 14 may also be referred to as a second type to distinguish it from the direct determination explained above of minimum contour point 13 ascertained based on shortest contour point distance 15, which may also be referred to as the first type.

As an example for row 8.2, the procedure will be described in greater detail according to this optional determination of a minimum contour point 14.1 of the second type instead of a minimum contour point 13 of the first type. Row 8.2 contains single contour point 11.4. A connecting line to minimum contour point 13.1 of row 8.1 now has an intersection with lower row line of row 8.2, which has a shorter contour point distance 15 to vehicle longitudinal axis 2. However, the connecting line from contour point 11.4 to contour point 11.5 of neighboring row 8.3 results in an even shorter contour point distance 15 at the intersection point with upper row line of this row 8.2. This point is now determined as minimum contour point 14.1 of the second type of row 8.2.

The same optional procedure for determining a minimum contour point 14.2, 14.4 of the second type also takes place in rows 8.3, 8.7. However, one special situation results in row 8.5, to which no contour point 11 has been assigned. In this case, it may be provided that the connecting line of contour points 11.6, 11.7 of neighboring rows 8.4, 8.6 are considered. The intersection points with row lines 8.5 in this case also yield possible minimum contour points 14 of the second type. In the present case, the intersection point with the lower row line of row 8.5 is minimum contour point 14.3 having the shortest contour point distance 15 and is therefore used to form a contour line 12 of the object or objects 5 in field of vision 4.

All other contour points 11.2, 11.4, 11.7, 11.9, i.e., the ones which are not also minimum contour points 13, may now be deleted from memory unit 41 for the purpose of reducing the data volume for the rest of method 30.

In a fifth method step 35, minimum contour points 13, 14 (i.e., of the first and second types) are now connected to form contour line 12 of object 5, as has been explained above. This contour line 12 simultaneously forms the free space boundary of free space 6 within field of vision 4. In other words, free space 6 is obtained as the free area starting from vehicle 1 to contour line 12 of object 5 in field of vision 4. Free space 6 ascertained in this way may now be used for driver assistance system 20 or an application area thereof, in this case, for example, automated parking, since vehicle 1 thereby has the information of how far it may be moved to the side without hitting objects 5 situated in field of vision 4.

Figure 9:
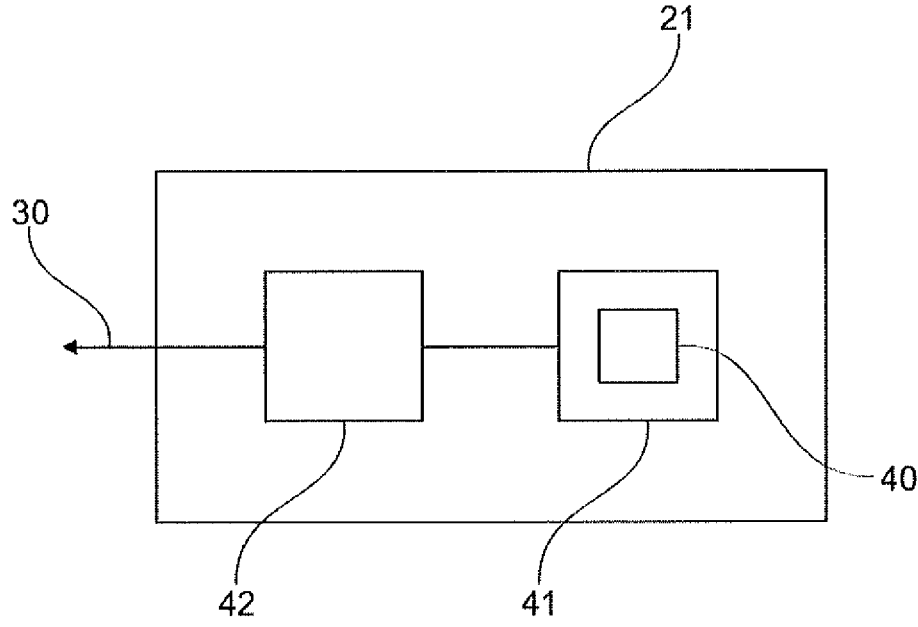
FIG. 9 shows a schematic representation of the control unit in the vehicle according to the invention from FIG. 7.

FIG. 9 purely schematically shows the details of control unit 21, including a computer 42 or a computing unit, and a memory unit 41. A computer program product 40 is stored on memory unit 41, which, when the computer program product is executed by computer 41, prompts the latter to carry out method 30 according to FIG. 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method to determine at least one free space in vehicle surroundings of a vehicle, the method comprising:
   receiving at least two-dimensional contour points of objects in at least one field of vision situated in the vehicle surroundings;
   assigning the received contour points to a plurality of rows, which subdivide the at least one field of vision;
   ascertaining, within each row having multiple contour points located therein, a minimum contour point, the minimum contour point having a shortest distance to a reference system of the vehicle; and
   connecting the minimum contour points, that were respectively ascertained for each row having multiple contour points located therein, to form a contour line that extends across the plurality of rows and indicates a boundary of the at least one free space within the at least one field of vision, so that a distance between the reference system of the vehicle and the contour line is determined and is utilized to implement a driver assist application within the at least one free space by a driver assistance system provided in the vehicle,
   wherein the receiving, assigning, ascertaining and connecting steps are implemented in a computer of the driver assistance system, and
   wherein any contour points that are not ascertained as minimum contour points are deleted from a memory of the computer prior to forming the contour line.

2. The method according to claim 1, wherein the reference system is a vehicle longitudinal axis and/or a vehicle transverse axis of the vehicle.

3. The method according to claim 1, further comprising capturing the contour points of the objects in the vehicle surroundings by a vehicle sensor of the vehicle.

4. The method according to claim 1, wherein, at least two fields of vision situated in the vehicle surroundings are considered, and the steps of ascertaining and connecting are carried out for at least two of the at least two fields of vision.

5. The method according to claim 4, wherein four fields of vision situated in the vehicle surroundings are considered, which together form an area completely surrounding the vehicle, and the steps of ascertaining and connecting are carried out for at least two of the four fields of vision.

6. The method according to claim 4, wherein, for different driver assist applications in the driver assistance system, at least one application field of vision within the at least two fields of vision is determined, which is relevant for the application, and the steps of ascertaining and connecting being carried out for the at least one application field of vision of the at least two fields of vision.

7. The method according to claim 1, wherein a free parking space is ascertained based on the at least one free space.

8. The method according to claim 1, wherein, for each row without any contour points located therein, the contour points of nearest neighboring rows are determined and are connected to each other by a connecting line, so that a point that lies on the connecting line within each of the rows without any contour points located therein, and that has a shortest distance to the reference system of the vehicle, is ascertained as the minimum contour point.

9. The method according to claim 1, wherein, when a connecting line that extends from a contour point assigned to a particular row to a contour point of a neighboring row has a point that lies on the connecting line within the particular row, and the point has a shorter distance to the reference system of the vehicle than a minimum contour point already assigned to the particular row, then the point on the connecting line having the shorter distance is now ascertained as the minimum contour point of the particular row.

10. The method according to claim 1, wherein a row height of the plurality of rows of the at least one field of vision and/or a position of the at least one field of vision within the vehicle surroundings is/are determined depending on at least one driving parameter or a velocity.

11. The method according to claim 1, wherein different rows of the plurality of rows of the at least one field of vision are defined with different row heights.

12. A non-transitory computer-readable medium storing a computer program thereon, that when executed by the computer of claim 1, causes prompt the computer to carry out the method according to claim 1.

13. A control unit for a vehicle, wherein the control unit is the computer of claim 1 that is configured to carry out the method according to claim 1.

14. A driver assistance system comprising a control unit according to claim 13 and a vehicle sensor for capturing the contour points of the objects in the at least one field of vision in the vehicle surroundings.

15. A vehicle comprising a driver assistance system according to claim 14.

16. The method according to claim 1, wherein the driver assist application is an automated parking of the vehicle that is performed by the driver assistance system of the vehicle.

\* \* \* \* \*